Patented May 28, 1946

2,401,194

UNITED STATES PATENT OFFICE 2,401,194

CHLORINATED RUBBER AND METHOD OF PRODUCING

Edwin Jacob Schlenk, Milltown, N. J., assignor to Hercules Powder Company, Wilmington, Del., a corporation of Delaware No Drawing. Application September 17, 1941, Serial No. 411,155

4 Claims. (Cl. 260—772)

This invention relates to a method of producing a chlorinated rubber of improved characteristics and to the improved product resulting. It relates more particularly to a method of producing chlorinated rubber having high initial and permanent flexibility in the form of an unplasticized film and to the improved chlorinated rubber so characterized obtained.

Chlorinated rubber obtained by chlorination of natural rubber has been known to be deficient when used in the form of films or coatings particularly because it has had very little flexibility in thin films and it has rapidly become more brittle with age. It has been customary to incorporate plasticizers with the chlorinated rubber to improve its flexibility but such plasticizers as have been suggested have not provided flexibility over extended periods and furthermore have lead to considerably decreased chemical resistivity of the films.

It has now been found in accordance with this invention that chlorinated rubber having inherently different flexibility characteristics from ordinary chlorinated rubber may be produced. Thus, it has been found that a chlorinated rubber having the property of high initial and permanent flexibility when in the form of an unplasticized film may be produced by a process involving two essential, mutually dependent stages. In the first stage, natural rubber is digested with water at a temperature within the range from about 180° C. to about 235° C., and preferably about 190° C. to about 210° C. until the rubber has become reduced in viscosity, such that after subsequent washing, it will have a viscosity in a 1% carbon tetrachloride solution at 25° C. equivalent to no more than about 10%, and preferably no more than about 5%, of the viscosity of a 2-day old 1% solution of the original untreated rubber in the same solvent, as measured by the Hercules capillary tube method. The digested rubber obtained will be very soft in comparison with the original rubber and therefore will be relatively useless for applications in which the mechanical properties of rubber are of importance, as in submarine cable insulating compositions. The extent of heating required to provide the digested rubber of the above viscosity characteristics at the above-mentioned temperatures will generally fall within the range from about one to about 8 hours. In the second stage of the process the digested rubber, after being washed and dried, is dissolved in a chlorination solvent such as for example, carbon tetrachloride, tetrachlorethane, ethylene dichloride, chloroform, benzene, etc., and chlorinated by passing chlorine into the solution until the digested rubber has become chlorinated to the extent of about 62 to about 70% by weight of chlorine. The chlorinated product of high initial and permanent flexibility is then recovered by any suitable means, such as by precipitation, solvent evaporation, etc.

The natural rubber which is digested in accordance with the invention will preferably be in a form which is easily penetrated by the water under the digestion conditions. Thus, slices of thin-sheet crêpe rubber as it appears on the market in the form of bales is very satisfactory. Smoked sheet rubber which is available in densely packed bales is also satisfactory. Such smoked sheet rubber is preferably reduced to thin sheets prior to the digestion treatment. Thick sheet crepe rubber may be employed if desired. Natural or preserved latex, artificial dispersions of rubber in other forms such as cheap low grades of rubber, vulcanized rubber, etc., may also be used. The digestion treatment serves to eliminate objectionable impurities present in low grades of rubber and thus renders such low grade rubber useful in the process.

The digestion of the rubber with water will be carried out in an autoclave or other suitable pressure device capable of withstanding the pressure involved by heating water at the above designated temperatures. The amount of water employed will be sufficient to cover the rubber in the pressure vessel and may be any excess over such an amount desired. After completion of the digestion the rubber is washed with fresh water to remove any soluble digestion products remaining in the rubber. The washing may be carried out by any suitable means, such as at moderate temperatures up to 100° C. on a mechanical rubber washer. The washed digested rubber is then dried in any suitable manner such as by rolling on hot surfaces, for example on the rolls of a mechanical rubber washer. The drying will be sufficient to remove substantially all the water. The loss in weight encountered in the digestion treatment is very slight and the yield of digested rubber will usually be above about 97% by weight based on the weight of the original rubber. The proteinaceous impurities are substantially removed but the acetone extractable matter present in the original rubber is not removed by the digestion treatment and remains in the digested rubber in substantially the original amount.

The time of digestion within the temperature range of 180° C. to 235° C. to provide the digested rubber of the above-defined viscosity characteristics will depend on the actual temperature of digestion, the particular characteristics of the rubber used, as well as on other obvious factors. At the higher temperatures in the above range the rubber of desired reduced viscosity is obtained with a shorter digestion period. Generally, digestion for at least one hour at 235° C. up to 8 hours at 180° C. will provide the desired transformation in the rubber. In any event, the digestion is carried out in the above-defined temperature range for a period of time sufficient to reduce the viscosity of the rubber to a point at which the rubber after washing and drying will have a viscosity in a 1% carbon tetrachloride solution at 25° C. equivalent to no more than about 10% and preferably no more than about 5% of the viscosity of a 2-day old solution of the original untreated rubber in the same solvent, as measured by the Hercules capillary tube method.

The process of digesting rubber with water at the temperatures and for the times described above produces a profound change in the rubber. While the digestion treatment serves to substantially remove the protein content of the rubber, it does not appear that the decreased nitrogen content is correlated with the high initial and permanent flexibility characteristics obtained in the chlorinated product. It appears that the digestion produces a breakdown in the rubber molecule itself into polymeric units of smaller size and that such a chemical change in the rubber hydrocarbon itself accounts for the different characteristics of the rubber as compared with ordinary natural rubber when transformed into the chlorinated derivative containing from about 62 to about 70% of combined chlorine. In addition to the above defined viscosity, the digested rubber will be characterized by containing substantially all the acetone extractable material originally present in the natural rubber.

The chlorinated digested rubber obtained in accordance with the described process will have the characteristics of high initial flexibility when used in the form of unplasticized films as compared with ordinary chlorinated rubber and by the permanence of such flexibility on aging. Ordinary chlorinated rubber, on the other hand, has very little initial flexibility in the form of an unplasticized film and becomes even more brittle on short periods of aging. The chlorinated digested rubber will be additionally characterized by a freedom from haze in solution. This latter characteristic is of considerable importance in production of solutions of lower opacity for use in protective coatings of various types. The chlorinated digested product will also be more stable chemically than ordinary chlorinated rubber obtained from untreated crepe rubber.

The yield of chlorinated digested rubber obtained in the process of the invention will be only slightly lower than that obtainable with ordinary undigested rubber. The loss of rubber during the digestion treatment never exceeds about 3%. The yield of chlorinated product obtained from a given amount of crude rubber will consequently be only slightly less than that obtainable from untreated rubber, and thus the improved chlorinated product is provided with very little sacrifice in yield.

The following specific examples will serve to illustrate the various embodiments of the invention:

*Example 1*

Thin-sheet crepe rubber was cut into thin slices and heated in an autoclave with a sufficient amount of water to cover the rubber at a temperature of 180° C. for a period of 8 hours. The autoclave was then cooled, opened, and the digested rubber washed with water at a temperature of about 95° C. in a mechanical rubber washer, then dried in the same equipment by heating the rolls of the rubber washer and the vessel itself with steam. The dried digested rubber obtained had a viscosity of 6.5 seconds in a 1% carbon tetrachloride solution at 25° C., as measured by the Hercules capillary tube method. This compares with a viscosity of 1330 seconds for a 2-day old 1% solution of the untreated rubber in the same solvent. The yield of digested rubber obtained was 98.8% by weight based on the rubber used. The digested rubber was dissolved in carbon tetrachloride to give a 5% by weight solution and chlorinated by passing chlorine gas into the solution until the chlorinated digested rubber contained about 69.2% of chlorine. The chlorinated product was then recovered by precipitation in water and freed from water by centrifuging and drying in a drier at a temperature reaching a maximum of 65° C. The chlorinated digested rubber obtained had a viscosity of 133 centipoises in a 20% toluol solution. It had an initial flexibility value in an unplasticized film of 2 mils thickness represented by 63 double folds on a Schopper film testing machine. After aging of the film for 42 days the flexibility was unchanged.

*Example 2*

The procedure of Example 1 was duplicated except that the digestion treatment was for 4 hours. The digested rubber obtained had a viscosity of 10 seconds in a 1% carbon tetrachloride solution at 25° C. by the Hercules capillary tube method and was obtained in a yield of 99% based on the weight of rubber used. The chlorinated product obtained had a chlorine content of 66.2%, and an initial flexibility in an unplasticized film of 2 mils thickness represented by 59 Schopper double folds. After aging of the film for 42 days the flexibility was found to be the same.

*Example 3*

The process of Example 1 was duplicated except with use of a digestion temperature of 198° C. and a digestion time of 2 hours. The digested rubber obtained had a viscosity of 5 seconds in a 1% carbon tetrachloride solution at 25° C. by the Hercules capillary tube method. The yield of digested product was 98.5% based on the weight of the rubber. The chlorinated digested rubber produced had a chlorine content of 69.1%. In an unplasticized film of 2 mils thickness it had an initial flexibility as represented by 38 Schopper double folds. After aging of the film for 42 days this initial flexibility had increased to 58 Schopper folds.

*Example 4*

Thin-sheet crepe rubber as used in Example 1 in small slices was digested in an autoclave with a sufficient amount of water to cover the rubber for a period of 1½ hours at a temperature of 220° C. The digested rubber obtained after washing and drying as in Example 1 had a viscosity in a 1% carbon tetrachloride solution at 25° C. of 5.7 seconds by the Hercules capillary tube method. The yield of digested rubber was 97.5% based on the weight of rubber used. The dried digested rubber was chlorinated in a 5% carbon tetrachloride solution as in Example 1 to give a chlorinated product containing 67% by weight of combined chlorine. The chlorinated product had an initial flexibility in an unplasticized film of 2 mils thickness represented by 49 Schopper double folds. This original high flexibility was retained on aging.

*Example 5*

The procedure of Example 4 was duplicated with use of a digestion temperature of 235° C. and a digestion time of one hour. The dried digested rubber had a viscosity of 6 seconds in a 1% carbon tetrachloride solution at 25° C. by the Hercules capillary tube method and was obtained in a yield of 98% by weight based on the original rubber. Chlorination of the dried digested rubber provided a chlorinated product which contained 67.3% by weight of combined chlorine. The flexibility of a freshly prepared film of the chlorinated product of 2 mils thickness was found to be 54 Schopper double folds. The film retained its original high flexibility on aging.

From the above description and examples it will be obvious that the described process provides a chlorinated rubber having highly desirable improved properties. The high initial and permanent flexibility characteristics of the chlorinated product do not exist in ordinary chlorinated rubber and are of such definite significance as to render the chlorinated rubber adapted to many commercial applications for which the ordinary chlorinated rubbers have not been suited due to their low film flexibilities. The improved product will thus be much more satisfactory in varnishes, lacquers, paints, etc. Furthermore, the process provides such an improved chlorinated rubber with very little sacrifice in yield and is therefore highly economical for commercial exploitation.

It will be understood that the details and examples hereinbefore set forth are illustrative only and that the invention as broadly described and claimed is in no way limited thereby.

What I claim and desire to protect by Letters Patent is:

1. The method of producing chlorinated rubber characterized by containing from about 62 to about 70% chlorine and by high initial and permanent flexibility when in the form of an unplasticized film which comprises the steps of digesting rubber with water at a temperature within the range of about 180° C. to about 235° C. until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

2. The method of producing chlorinated rubber characterized by containing from about 62 to about 70 per cent chlorine and by high initial and permanent flexibility when in the form of an unplasticized film which comprises the steps of digesting rubber with water at a temperature within the range of about 180° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

3. The method of producing chlorinated rubber characterized by containing from about 62 to about 70 per cent chlorine and by high initial and permanent flexibility when in the form of an unplasticized film which comprises the steps of digesting rubber with water at a temperature within the range of about 190° C. to about 210° C. until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

4. The method of producing chlorinated rubber characterized by containing from about 62 to about 70 per cent chlorine and by high initial and permanent flexibility when in the form of an unplasticized film which comprises the steps of digesting rubber with water at a temperature within the range of about 190° C. to about 210° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

EDWIN JACOB SCHLENK.